(No Model.)
B. L. TOQUET.
ADJUSTABLE THRUST BEARING FOR SCREW HOISTS.
No. 532,995. Patented Jan. 22, 1895.
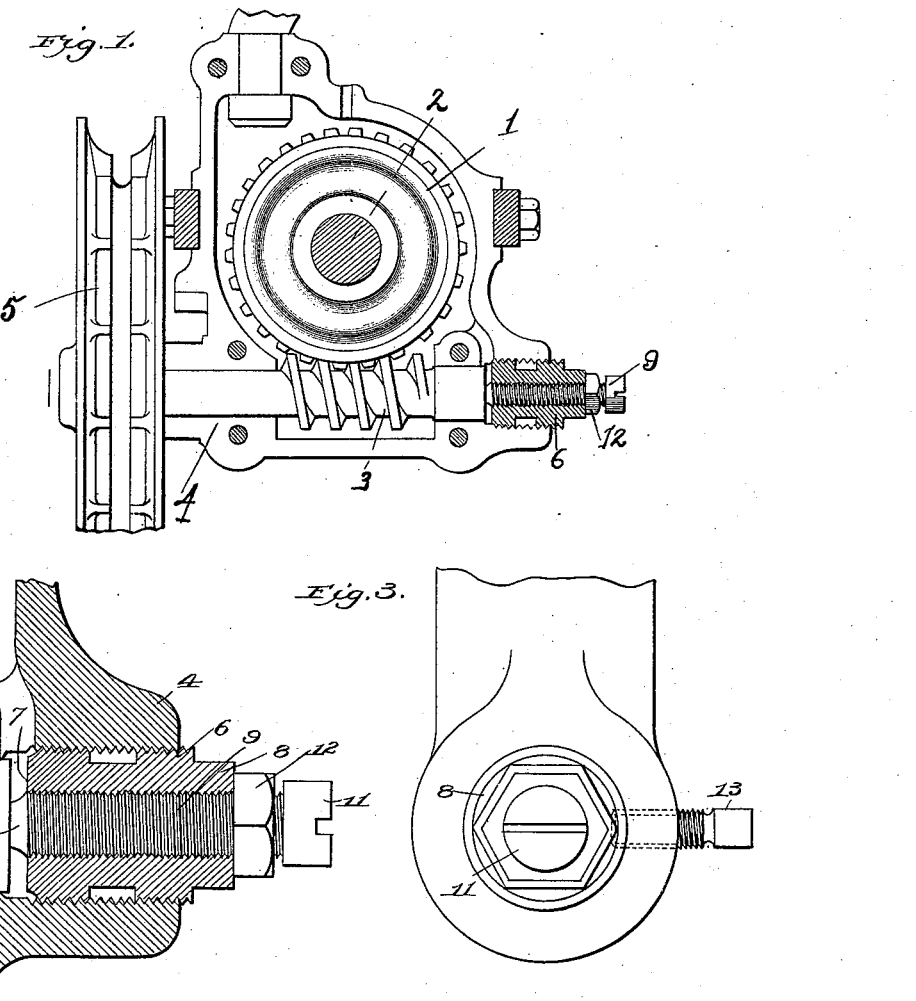
Witnesses:
Henry T. Rohrer
Walter E. Allen
Inventor:
Benjamin L. Toquet
By Knight Bros.
Attys.

UNITED STATES PATENT OFFICE.

BENJAMIN L. TOQUET, OF WESTPORT, ASSIGNOR TO THE YALE & TOWNE MANUFACTURING COMPANY, OF STAMFORD, CONNECTICUT.

ADJUSTABLE THRUST-BEARING FOR SCREW-HOISTS.

SPECIFICATION forming part of Letters Patent No. 532,995, dated January 22, 1895.

Application filed May 14, 1894. Serial No. 511,235. (No model.)

*To all whom it may concern:*

Be it known that I, BENJAMIN L. TOQUET, a citizen of the United States, residing at Westport, in the county of Fairfield and State of Connecticut, have invented certain new and useful Improvements in Adjustable Thrust-Bearings for Screw-Hoists; and I do hereby declare that the following specification, taken in connection with the accompanying drawings, is a full, clear, and exact description of my improvements.

My invention relates to an improved form of thrust bearing for resisting the end thrust of the driving screw in a pulley block or other screw hoist, whereby the lowering action of the block or hoist, may be regulated. In these machines the chief purchase or gain of power is obtained by means of a worm or screw and wormwheel the proportions of the pitch of which are so adjusted that the frictional resistance of the moving parts is about sufficient to hold the load suspended in any position, thus preventing the block from running down. For some purposes it is desirable that the load should remain suspended until the mechanism is positively moved backward by hand or otherwise, while for others it may be desirable that the load when once started should continue to run down by gravity until the motion of the machine is positively arrested.

I provide means whereby the same block can be readily adjusted so as to hold its load except when the mechanism is positively moved backward, or so that the load when once started will run down by gravity. I accomplish this by providing a thrust bearing or stop at the end of the worm shaft or screw, of such construction as to enable me to conveniently modify the frictional resistance developed between this bearing and the shaft when the latter rotates. Similar objects have been aimed at by the device patented by Henry R. Towne in Patent No. 512,071, but my device possesses some advantages over that shown in the Towne patent, and the means used by me are different.

The amount of friction resultant from the pressure of the shaft against the thrust bearing will depend, other conditions being equal, upon the mean radius at which the friction on the end of the shaft acts. My device provides for conveniently varying this radius at will, and consists in providing two or more adjustable bearings which are adapted to be presented to the end of the driving screw either separately or together at will according to the amount of frictional resistance desired.

In my device the end of the shaft may bear against a screw plug inserted in the frame of the hoist, of such diameter that the shaft will bear against it near its periphery, the friction then acting at a considerable radius and causing the block to be self-sustaining; or the shaft may bear directly against the end of a screw which I insert through this screw bearing plug, which, by being screwed up, may relieve the main bearing from the pressure of the shaft, transmitting this pressure to the end of the screw, which is of smaller diameter, and therefore reducing the radius at which the friction acts. I am thus able, by the simple adjustment of this screw and screw plug, to cause the block to be self-sustaining, or to run down by gravity when the load is once started, and do it without removing any parts in a way that is entirely simple.

In order that my invention may be fully understood I will first describe the same with reference to the accompanying drawings and afterward more particularly point out the novel features in the claims.

In said drawings: Figure 1 is a side elevation of the pulley block or screw hoist having one half of the casing removed and showing the preferred form of my improved convertible thrust bearing in place. Fig. 2 is an enlarged detail sectional view of the same form of bearing. Fig. 3 is a detail end elevation of the bearing shown in Fig. 2.

For the purpose of illustrating the application of my invention I have shown it applied to the form of pulley block disclosed in my Patent No. 496,328, granted April 25, 1893, but it is obvious that the bearing could be applied to other forms of screw hoists.

1 is the worm wheel journaled on the gudgeons 2 and provided with suitable chain wheels which are not shown.

3 is the worm or driving screw having suitable bearings in the lower part of the casing 4 and provided on its projecting end with the power wheel 5.

6 is the externally and internally threaded bearing plug which screws in the threaded opening in the casing 4 and is adapted to present its inner bearing face 7 to the end of the driving screw 3. The plug is formed with the hexagonal or square shoulders 8 adapted to be engaged by a wrench for the purpose of inserting and adjusting the plug.

9 is a bearing screw passing concentrically through the bearing plug 6 and working in the internally threaded passage of said plug 6 and having the inner bearing end 10 which is adapted to project beyond the bearing face 7 of the plug 6 into contact with the driving screw 3. The screw 9 has a nicked head 11 and a clamping nut 12, by means of which it can be adjusted and secured in position.

13 is a screw for clamping the plug 6 in place.

It will be observed that the bearing plug 7 and the bearing screw 10 can be presented against the end of the driving screw 3 either separately or together, at will, and by this means the frictional resistance to the end of the screw can be adjusted so that the action of the hoist can be regulated.

Having thus fully described my invention, the following is what I claim as new therein and desire to secure by Letters Patent:

1. An adjustable thrust bearing for screw hoists, comprising two adjustable bearings having frictional surfaces of different diameters which are adapted to be presented to the end of the screw shaft separately or together, and means for regulating the friction of the bearings upon the end of the screw shaft, substantially as set forth.

2. In combination with a screw hoist, an adjustable shaft bearing, consisting of an outer and an inner screw plug, either or both of which may be brought in contact with the shaft, substantially as described.

3. The combination of the worm or driving screw of a hoist journaled in a suitable casing, an externally and internally threaded bearing plug fitted in a threaded opening of said casing and adapted to be presented to the end of the driving screw, a bearing screw working in the internal threaded opening of said plug and adapted to be presented to the driving screw either alone or together with the plug, and means for adjusting the bearings separately, substantially as set forth.

BENJAMIN L. TOQUET.

Witnesses:
SCHUYLER MERRITT,
HARRY S. PROVOST.